Sept. 18, 1928.  1,685,049
R. M. GALLOWAY
OIL GEAR CONTROL FOR MACHINE TOOLS
Filed May 4, 1926    7 Sheets-Sheet 1

Sept. 18, 1928.  R. M. GALLOWAY  1,685,049

OIL GEAR CONTROL FOR MACHINE TOOLS

Filed May 4, 1926  7 Sheets-Sheet 3

Sept. 18, 1928.  
R. M. GALLOWAY  
OIL GEAR CONTROL FOR MACHINE TOOLS  
Filed May 4, 1926  
1,685,049  
7 Sheets-Sheet 4

Inventor  
Robert M. Galloway  
By Attorney  
Albert P. Nathan

R. M. GALLOWAY 1,685,049

OIL GEAR CONTROL FOR MACHINE TOOLS

Filed May 4, 1926         7 Sheets-Sheet 6

Inventor
Robert M. Galloway
By Attorney
Albert P. Nathan

Sept. 18, 1928.

R. M. GALLOWAY

OIL GEAR CONTROL FOR MACHINE TOOLS

Filed May 4, 1926   7 Sheets-Sheet 7

Patented Sept. 18, 1928.

1,685,049

UNITED STATES PATENT OFFICE.

ROBERT M. GALLOWAY, OF RICHMOND, INDIANA, ASSIGNOR TO THE NATIONAL AUTOMATIC TOOL COMPANY, OF RICHMOND, INDIANA, A CORPORATION OF INDIANA.

OIL-GEAR CONTROL FOR MACHINE TOOLS.

Application filed May 4, 1926. Serial No. 106,781.

Various types of machines include elements which, in the operation thereof necessarily must be reciprocated in opposite directions at varying speeds.

To effect these reciprocations it has heretofore been customary to equip the machines with various types of mechanical transmissions each of which has had certain disadvantages and none of which has been entirely satisfactory in that they all produce vibration, are more or less noisy, and do not lend themselves readily to sudden changes in speed and direction of motion.

More or less recently these difficulties have been overcome by the employment of hydraulic means for actuating the reciprocatory members. This improved means comprises a cylinder within which is fitted a piston to which is attached the part to be reciprocated. Pipes, adapted to carry fluid under pressure, are connected with the cylinder at opposite sides of the piston and the admission of fluid into the cylinder through either of said pipes causes the member to be moved in the desired direction. It will readily be perceived that by the use of hydraulic pressure the member may be moved in either direction and reversed without noise or vibration and that the speed of movement may be controlled to a nicety by regulating the flow of fluid into the cylinder. To regulate the direction and amount of flow of liquid into the cylinder there has been provided a variable displacement pump, which, by simple adjustments, may be caused to deliver large quantities of liquid at a low pressure or deliver small quantities at high pressure into either end of the cylinder. Therefore by the use of this type of pump the member to be translated may be moved at any speed, from zero to maximum speed, in either direction and changes in the rate readily may be effected at any time in the course of its travel. There has, however, been no satisfactory device heretofore provided for automatically varying the action of the pump and therefore the adjustments therein have usually been effected manually.

This invention therefore has for its primary object to provide a simple and effective automatic control for the variable displacement pump forming a part of a variable and reversible hydraulic transmission.

A multiple spindle drilling machine is a good example of a machine having a member required to be translated at various speeds during its operation and therefore this invention will, for convenience, be shown and described in connection with that type of machine tool, but it is to be understood that this is merely one practical embodiment of the invention and that various other uses are contemplated.

A multiple drilling machine includes a standard, a work support and a tool head translatably fitted to the standard and adapted to be moved toward and from the work support. Preparatory to drilling certain work it is necessary that the drill-head be given a substantial downward traverse to bring the drills into contact with the work, and, to save time it is desirable that this movement be effected at a rapid rate. During the drilling of the work the down feed of the head necessarily must be at a rate substantially slower than the rapid down traverse. At the completion of the drilling operation the drill head must be elevated and inasmuch as no drilling operation is then being effected this reverse movement also may be at the rapid rate.

The objects of this invention have been attained by providing means automatically to actuate a cycle control valve (which in turn controls the action of the variable displacement pump) by the movement of the drill-head. This has been effected by means of a valve-actuator carried by the drill-head, which actuator is shifted to various effective positions at predetermined times and in a predetermined sequence by a plurality of dogs adjustably supported adjacent the path of movement of the valve actuator. By varying the positions of these dogs the valve may be so manipulated as to effect translation of the head at any desired speed in either of two directions.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure, and in such drawings, like characters of reference denote corresponding parts throughout all the views, of which:—

Fig. 3 is an elevation of the pump controlling mechanism, looking in the direction of the arrow $a$ in Fig. 2. Fig. 4 is a side elevation, partly in section, of Fig. 3 looking in the direction of arrow $b$. Fig. 12 is a side view of one of the slide-bar locking plungers later to be referred to. Figs. 14, 15, 16, 17 and 18 are sectional views showing various positions of the pump controlling valve later to be referred to. Fig. 26 is a view of a double dog which may be utilized simultaneously to depress two adjacent cycle controlling plungers, later to be referred to.

Referring to the drawing more specifically the invention is disclosed as embodied in a multiple spindle type drilling machine comprising a base 1, a standard or column 2 and a drill head 3 translatably supported upon ways at the front face of the standard and adapted to carry any suitable number of drill spindles 4. Each of these spindles is operatively connected with and is rotated from a main spindle-driving shaft 5, (rotatably journaled in a bracket 6 at the upper end of the standard) and extending downwardly into the drill-head. The shaft 5 may be rotated by any suitable or preferred mechanism such for example as that shown in Figs. 1 and 13 and comprising a motor or other prime mover, M, having a shaft 7 upon which is secured an initial drive gear 8, meshing with a gear 9 on a horizontally disposed shaft 10, journaled in bearings 11 and 12 in the machine base. At its forward end the shaft 10 carries a bevel gear 13 which meshes with and drives a similar gear 14 secured upon a shaft 15 journaled vertically in the standard in bearings 16 and 17. The upper end of the shaft 15 enters a gear-box 18 secured upon the standard 2 and a suitable train of gears 19, 20, 21 and 22 connects the shaft with a gear 23 having a splined connection with the shaft 5. The gears 19 and 20 are preferably pick-off speed change gears and therefore they may be interchanged or replaced by gears of other ratio to vary the speed of rotation of the spindles from a constant speed in the prime mover. The gear-box 18 is provided with a removable cover $18^c$ to afford access to the pick-off gears. Thus by means of the above described transmission the spindle driving shaft 5 may be rotated from the prime mover and may be translated through its driving gear in accordance with the vertical reciprocations of the drill-head.

As hereinbefore stated the drill-head is given reciprocatory movements by means of fluid pressure. To this end a vertically disposed cylinder 24 is secured to the column 2 and within the cylinder is slidingly fitted a piston 25, connected by a rod 26 and nuts 27 to the lower portion of the drill head. Fluid pressure, to move the piston 25 in the cylinder, is provided by a variable displacement pump P, hereinafter referred to, having two outlet pipes 28 and 29 connected with the upper and lower ends respectively of the cylinder. Thus, a flow of fluid (preferably oil) into the cylinder through the pipe 28 will cause the piston and the drill-head connected therewith to be depressed and likewise admission of fluid into the cylinder below the piston 25 through the pipe 29 will cause the piston and drill-head to be elevated. The speed at which the drill-head will be elevated or depressed is dependent upon the rate of flow of fluid into the cylinder.

The variable displacement pump P, which is adapted to effect a flow of fluid at any desired rate (from zero to maximum) through either of the pipes 28 or 29, is a commercial article known as an "oil-gear" and manufactured by The Oil Gear Co. of Milwaukee, Wisconsin and inasmuch as the specific construction of this pump forms no part of the present invention detailed illustration and description thereof is deemed unnecessary. For the purpose of this disclosure it will suffice to say that the pump is formed in its base with a reservoir and has an outlet pipe 30 and an inlet pipe 31. These two pipes connect with ports $30^a$ and $31^a$ respectively in a pump-controlling valve V to which are also connected pipes 32, 33, 34 and 35 communicating with ports $32^a$, $33^a$, $34^a$ and $35^a$ respectively. The valve V consists of a casing 36 having a central bore 37 within which is slidingly fitted a valve-core 38 adapted in its various positions selectively to effect communication between the inlet port 30ª and the ports 32ª, 33ª, 34ª and 35ª. The core 38 is hollow and at certain times permits a free flow of fluid from the port 35ª to the return pipe 31.

The pump P is so constructed that its degree of effectiveness and the direction of flow of fluid from the pump into the cylinder 24, (that is, either the pipe 28 or 29 is utilized to carry the output of the pump) is controlled by the return flow of fluid through the pipes 32, 33, 34 and 35. Stated briefly, a return flow through the pipe 32 effects a maximum output of the pump through the pipe 28 which effects a rapid traverse of the drill head downwardly. Return flow through the pipe 33 reduces the output of the pump and effects a slower down feed of the head under greater pressure. Return flow through the pipe 34 also effects a slow down feed of the head which may or may not be at the same rate as the first mentioned slow feed. For certain classes of work, such for example as where in a single operation relatively small holes are to be drilled substantially deeper than certain relatively large holes it may be desirable to have the first slow feed substantially faster than the second inasmuch as with such an arrangement the smaller drills may be fed into the work at a substantially fast rate until the larger drills engage the work and thereafter the drill-head may be depressed at the rate commensurate with the size of the large drills. The action of the valve V in selectively connecting the port 30ª with any one of the ports 32ª, 33ª, 34ª or 35ª whereby the action of the pump is controlled will best be understood from Figs. 8, 14, 15, 16, 17 and 18 considered in connection with Fig. 1 later to be referred to.

Figure 1:
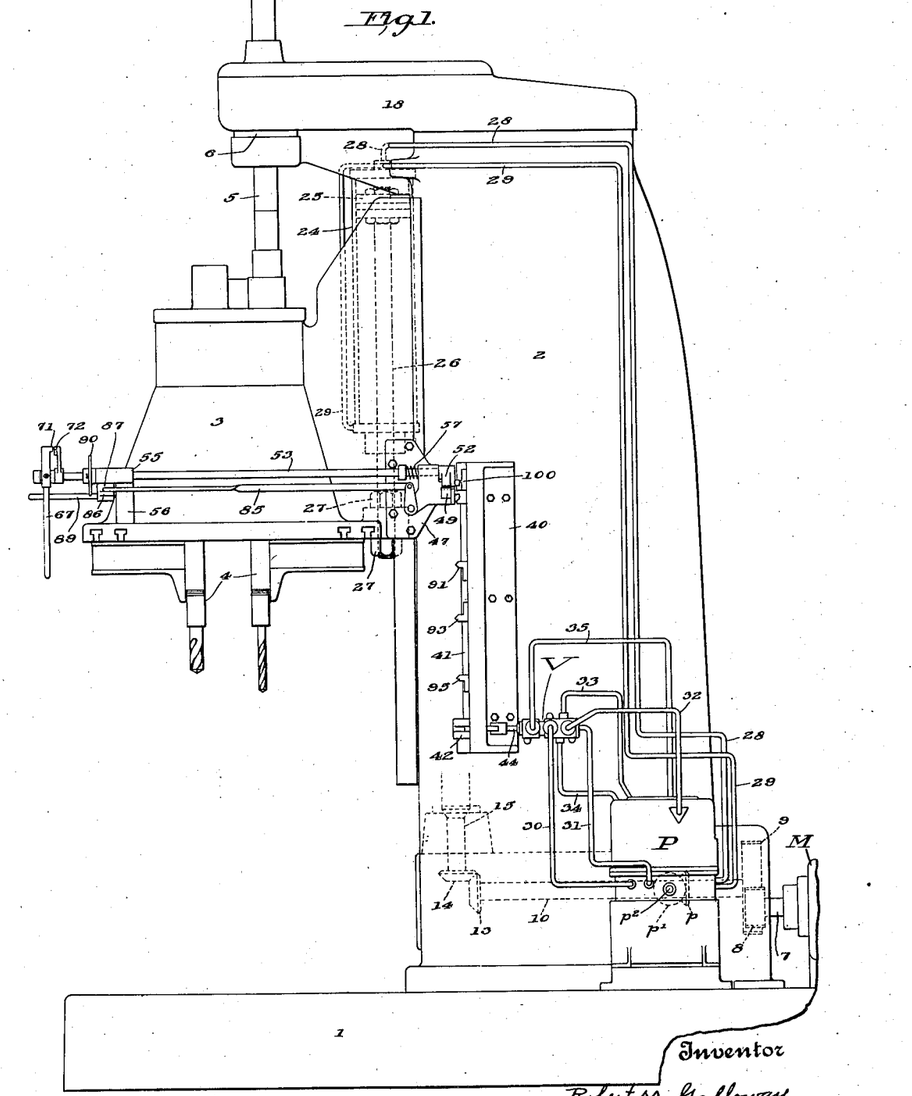
Figure 1 is a side elevation of a multiple spindle drilling machine equipped with hydraulically actuated means for translating the drill head, a variable displacement pump for varying the rate and direction of translation of the drill head and the automatic means for controlling the action of the pump.
Figure 13:
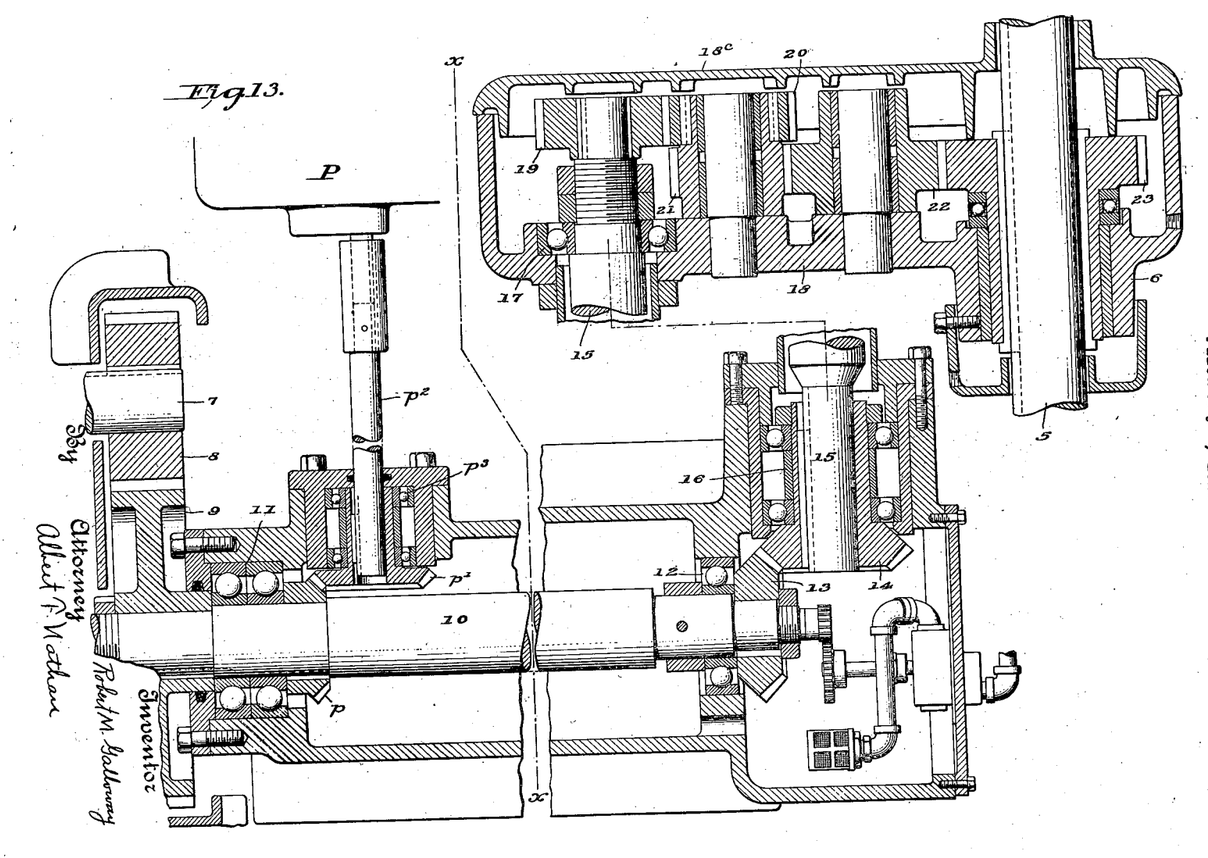
Fig. 13 is a sectional development of the drive from the prime mover to the variable displacement pump and from the prime mover to the drill-spindle rotating shaft which is carried by the drill-head and which is operatively connected to each of the several spindles, it being understood that the portion to the left of the dot-dash line $x$ is a horizontal section and the portion to the right of said line is a vertical section.
Figure 14:
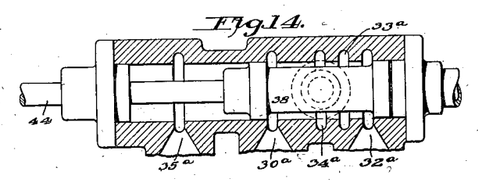
Figure 15:
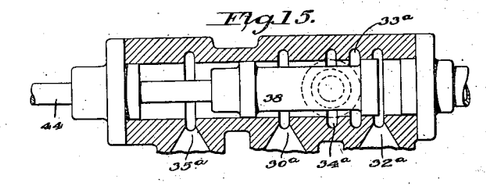
Figure 16:
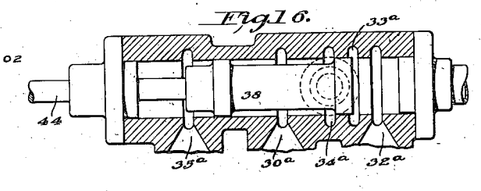

As shown in Figs. 1 and 13, power to actuate the pump is provided by the prime mover M and is transmitted to the pump from the shaft 10 by means of a bevel gear $p$ fixed to the shaft 10. This gear meshes with and drives a similar gear $p^1$ secured to the pump shaft $p^2$ and rotatably journaled in a bearing $p^3$ supported by the column.

Figure 17:
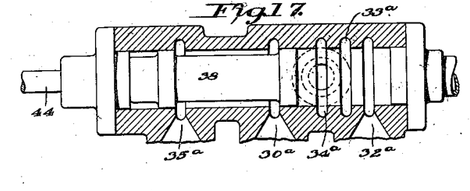

This invention provides an automatic control for the pump P whereby the speed and direction of movement of the drill-head may be regulated and changed automatically to effect any predetermined cycle as may be required by the nature of the working operation to be performed. To this end there is secured to the column 2, a bracket 40 within which is journaled a rock-shaft 41 carrying at its lower end a rock-arm 42. This arm is connected by a link 43 to a rod 44 pinned to the valve-core 38. Splined to the shaft 41 is a gear-segment 45 which has its toothed extremity fitted within a slot 46 provided by a bracket 47 fixed to the drill-head 3, thus the segment will be caused to translate with the drill-head while maintaining a driving connection with the shaft 41. The gear-segment 45 meshes with, and is actuated by, the teeth 48 of the rack-bar 49 slidingly fitted within a channel 50 formed in the bracket 47. The rack bar 49 is also provided with a second set of rack-teeth 51 which are engaged by the teeth of a gear-segment 52 secured upon a shaft 53 journaled at its rear end in a bearing 54 provided by the bracket 47 and at its forward end in a bearing 44 formed in the bracket 56 secured to the drill head. A coil spring 57, surrounding the shaft 53, has one end attached to the bracket 47 and the other end attached to a collar 58 secured to said shaft. Thus the spring 57 constantly tends to turn the shaft 53 in a clockwise direction, as viewed from the front of the machine, thereby through the action of the gear segment 51 to force the rack-bar inwardly toward the column. The rack-bar in turn tends to move the gear-segment 45 and shaft 41 clockwise, as viewed in plan, thereby to draw the valve core to its extreme left position as shown in Fig. 17 which position, as will later be explained, effected a rapid upward movement of the drill-head. Movement of the rack-bar 49, under the action of the spring 57, is controlled by a plurality of plungers 59, 60, 61 and 62 (one of which is shown in detail in Fig. 12) slidingly fitted in bores formed in the bracket 47. These plungers are preferably arranged in two horizontal planes and each is cut away partially as at $s$ to provide a channel through which the rack-bar passes, see Figs. 4, 11 and 12. Each of these plungers also is formed with an abutment $t$ adapted selectively to engage a shoulder 63 on the rack-bar 49 to limit the movement of the rack-bar. The shoulder 63 is preferably provided by a wear-block 64 fitted into a recess formed in the bar 49. The plungers are normally pressed outwardly, thereby holding their shoulders $t$ in the path of movement of the shoulder 63, by expansile springs 65 each having one end within a bore 66 in the plunger and having its other end bearing against a movable plate 67 later to be referred to.

During the movement of the drill-head the plungers are forced inwardly against the action of the springs 65 in a predetermined sequence by suitable dogs secured to the stationary bracket 40 thereby successively to release the rack-bar 49 and permit it to move inwardly toward the standard under the influence of the spring 57. These dogs are adjustably secured to the bracket by means of bolts having their heads fitted to T-slots in said bracket and both the dogs and the plungers have bevelled contacting faces whereby relative movement of the two causes the plungers to be moved inwardly by cam action. It will be perceived that as the plungers are successively released and the rack bar is moved in the direction of its length under the influence of the spring 57 the valve-core 38 will be moved in its casing to establish communication between the inlet port 30ª and the various outlet ports which, as hereinbefore explained, varies the action of the pump P.

Figures 2, 5, 6:
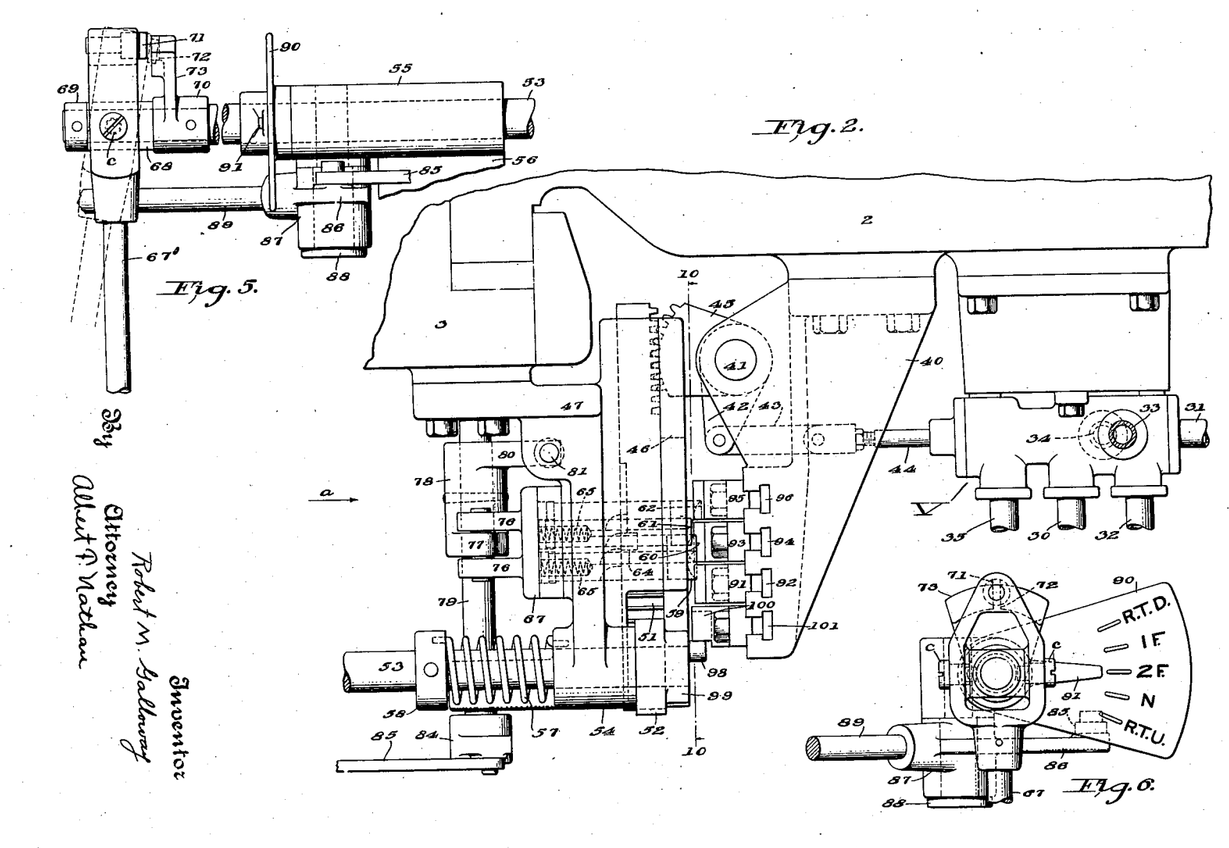
Fig. 2 is a plan of the pump controlling mechanism.
Fig. 5 is an enlarged detail side elevation of the mechanism for manually tripping the head translating mechanism into action and the emergency release therefor.
Fig. 6 is a left end view of Fig. 5.

The shaft 53 may be rotated counterclockwise, as viewed from the front of the machine, thereby to draw the rack-bar 49 to its extreme right position and to store power in the spring 57, by means of a hand-lever 67', pivoted at c to a block 68 rotatably mounted on the shaft 53 and held against endwise movement by collars 69 and 70 secured to the shaft. The hand-lever 67 normally is not operatively connected with the shaft 53 but it may be so connected (as shown in dotted lines Fig. 5) by swinging it about its pivot to cause a block 71, carried by the lever, to be engaged with a notch 72 formed in an arm 73 projecting from the collar 70.

Figure 11:
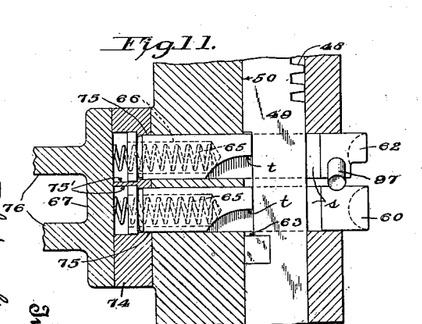
Fig. 11 is a detail horizontal section substantially on the line 11—11 of Fig. 10.
Figure 12:
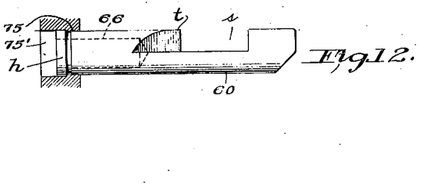

If, for any reason, during downward movement of the drill-head, it should be desired to discontinue the downward movement and have it moved to its uppermost position this may be effected by means now to be described. To the plate 67 against which the plunger-actuating springs bear, is secured a plate 74 formed with bores 75 for the shanks of the plungers and counter bores 75' for the heads h thereof. These counter-bores provide shoulders which engage the undersides of the heads h as shown in Figs. 11 and 12. The plate 67 is formed with spaced ears 76 which are pivoted to an arm 77 projecting from a sleeve 78 pinned to a rock shaft 79 journaled in the bracket 47. The sleeve 78 is also provided with an arm 80 adapted to receive the thrust of a spring-pressed plunger 81 fitted within a bore 82 in the bracket 47 and urged downwardly by a spring 83. A rock-arm 84, pinned to the shaft 79, is connected by a link 85 to an arm 86 of a bell-crank lever 87 fulcrumed on a stud 88 threaded into the bracket 56. The other arm 89 of the bell-crank lever constitutes a hand-lever which serves, at the will of the operator, to swing the lever 87 about its fulcrum and through the link 85, arm 84 causes the shaft 79 to be rocked in opposition to the spring 83, thus moving the plates 67 and 74 in a direction away from the rack bar 49 thereby removing the shoulders t of the plungers out of the path of the shoulder 63 and permitting the rack-bar, and thereby the valve core 38, to be moved to "rapid traverse up" position under the action of the spring 57, after which the head translating mechanism will be rendered ineffective as will hereinafter be explained.

In addition to serving completely to withdraw the rack-bar to start a complete cycle, the hand lever 67 may be utilized to set the valve-core 38 from neutral to any position to produce any single desired movement of the drill-head. An index plate 90 indicating the various available movements of the drill head, is secured to the bracket 56 and an indicator hand 91 secured to the shaft 53 cooperates with the index to indicate to the operator the necessary position of the lever 67 to effect any desired head movement.

*Operation.*

Figure 18:
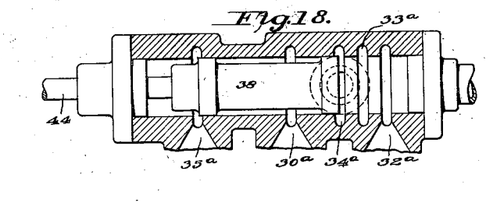
Figure 19:
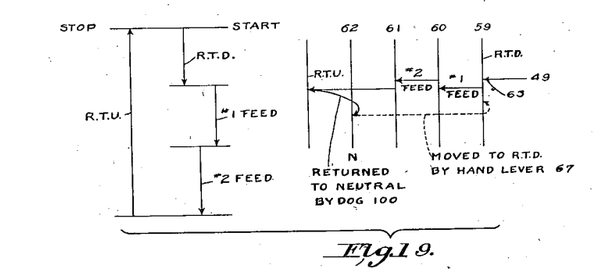
Figs. 19, 20, 21, 22, 23, 24 and 25 are diagrammatic views each showing one available cycle of transmission of the drill-head and the various positions of the valve actuator to effect that particular cycle.

When the drilling machine is operated so as to give the drill-head (1st) a rapid traverse down (2nd) a first slow speed feed down, which as hereinbefore described may be at an intermediate rate, (3rd) a second slow speed feed down, (4th) rapid traverse up, and then to be brought to neutral, all as indicated on the index plate 90, and illustrated in Fig. 19, the operation is as follows: Presupposing that the drill-head is in its uppermost position and the pump controlling valve is in neutral as shown in Fig. 18, the operator, by swinging the lever 67 about its pivot c engages it with the arm 73, then by turning it about the axis of the shaft 53 causes the shaft to be turned thereby pulling the rack-bar to its extreme right position against the action of the spring 57 and placing the shoulder 63 against abutment t of the plunger 59. This movement of the rack-bar shifts the valve core 38 to the position shown in Fig. 14 which causes the pump to produce its maximum flow through pipe 28 thereby rapidly depressing the piston 25 and the drill-head connected therewith. This rapid movement continues until dog 91, secured in the slot 92 in the bracket 40, contacts with and depresses the plunger 59 thus permitting the rack-bar 49 to be shifted under the action of the spring 57 until the shoulder 63 abuts against shoulder t of the plunger 60. This movement of the rack-bar shifts the valve-core 38 from the position shown in Fig. 14 to the position shown in Fig. 15 which causes the pump to slow down and depress the piston and drill-head at a slower (or intermediate) rate with greater power.

Further downward movement of the drill-head brings the plunger 60 into contact with a dog 93 secured in a slot 94 in the bracket 40, with the result that the plunger 60 is depressed thus taking the abutment t out of the path of the shoulder 63 and thereby permitting the rack-bar again to be shifted by the spring 57 until the shoulder 63 engages the abutment t of the plunger 61. This last movement of the rack-bar shifts the valve core 38 from the position shown in Fig. 15 to that shown in Fig. 16, thereby connecting the ports 30ª and 34ª and effecting a slow down feed of the drill-head under maximum pressure. This latter slow down feed may or may not be at the same rate as the first slow down feed as desired.

Figure 10:
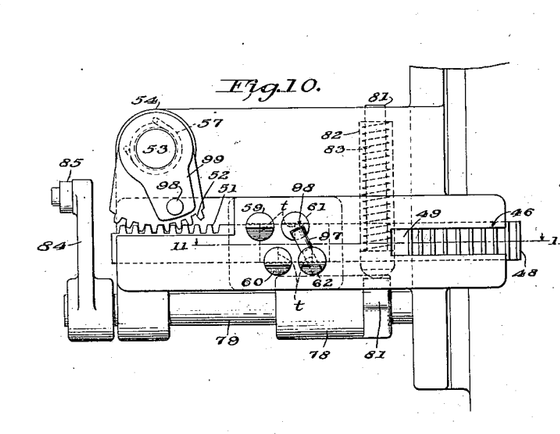
Fig. 10 is a detail view on the line 10—10 of Fig. 2.

The plunger 61 with which the rack-bar is now engaged is somewhat different from the plungers 59, 60 and 62 in that it is shorter and is not adapted to be engaged by any dog on the bracket 40. After the rack-bar engages the plunger 61 the drill-head continues to be depressed at a slow rate until a dog 95 secured in a slot 96 in the bracket 40, contacts with and depresses the plunger 62. This plunger carries a pin 97 which fits into a recess in the plunger 61 whereby depression of the plunger 62 likewise effects depression of the plunger 61 thus releasing the rack bar 49 and permitting it to move under the influence of the spring 57 carrying the shoulder 63 past the shoulders t of the plungers 61 and 62. Thus the rack-bar is moved to its extreme inward position and the valve core 38 is shifted from the position shown in Fig. 16 to that shown in Fig. 17 thereby connecting the ports 30ª and 35ª which causes the pump P to deliver its maximum output through the pipe 29 and effecting a rapid upward movement of the piston 25 and drill-head 3. It is to be noted that as yet the abutment t of the plunger 62 has performed no function inasmuch as the shoulder 63 of the rack-bar was held by the plunger 61 until the plunger 62 was moved to an ineffective position. Upward movement of the drill-head causes a stud 98, carried by an arm 99 integral with the gear segment 52, to be moved into contact with a cam-dog 100 secured in the slot 101 in the bracket 40 with the result that the gear-segment 52 is rotated slightly clockwise (as viewed in Fig. 10) and the rack-bar 49 is moved outwardly in opposition to the spring 57, sufficiently to bring the shoulder 63 behind and into contact with the abutment t of the plunger 62 which heretofore has performed no function. This backward movement of the rack-bar shifts the valve core from the position shown in Fig. 17, where it was effecting a rapid upward movement of the drill-head, to the position shown in Fig. 18, in which the port 30ª is isolated from all of the other ports and therefore the pump is rendered ineffective, and the drill-head comes to rest in its uppermost position as determined by the dog 100. The parts will remain in their neutral positions until the hand-lever 89 is again actuated to move the rack-bar to its outermost position.

Figure 20:
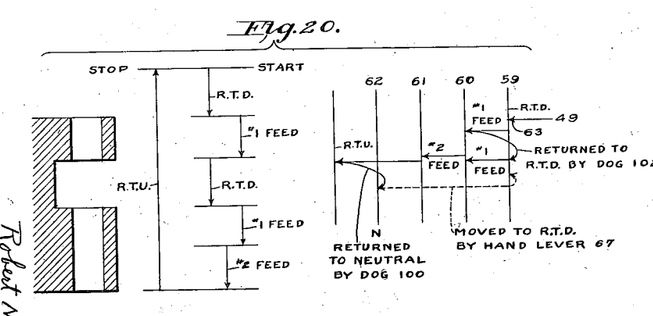

In drilling certain work such for example as work having a first boss to be drilled, then a space, and then another boss to be drilled, (see Fig. 20) it is desirable to throw in the rapid down traverse of the drill-head after the first boss has been drilled to reduce to a minimum the time required to jump from one boss to the next, which time would be considerable were the slow down feed resorted to. This readily may be effected by securing, in the slot 101 of the bracket 40, below the dog 91, and above the dog 93, a dog 102 having a cam surface 103 (see dotted line in Fig. 3) adapted to act upon the stud 98 to turn the gear-segment 52 about its axis thereby to draw the rack-bar 49 outwardly until the shoulder 63 which previously had been in engagement with the plunger 60 is again brought behind the abutment t of the plunger 59. This retraction of the rack bar shifts the valve-core 70 to the position shown in Fig. 14 which again effects a rapid downward movement of the drill-head after which the operation is as hereinbefore described. With this arrangement an additional dog 104 will be secured in the slot 92 to depress the plunger 59 again after the second rapid traverse and the dog 93 will be positioned in the slot 94 as far below the dog 102 as the extent of the second rapid traverse of the drill-head or in other words substantially the distance between the two bosses to be drilled as shown in dotted lines Fig. 3.

Figure 21:
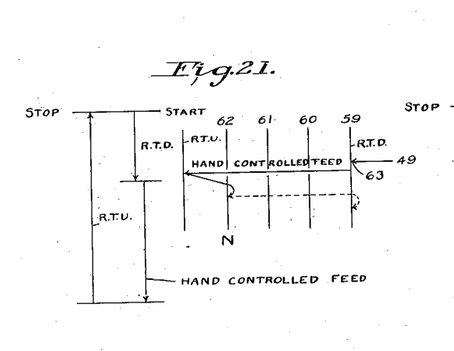

As hereinbefore described the operator may, at any desired time, (by actuating the lever 89) retract all of the plungers 59, 60, 61 and 62 and thereafter control the speed and direction of movement of the drill-head by means of the hand lever 67'. This permits operation of the machine in the cycle illustrated in Fig. 21, in which the head is given (1) a rapid traverse down (2) a feed down under control of the operator (3) rapid traverse up, and then brought to rest by the action of the dog 100 on the lever 99.

Figure 22:
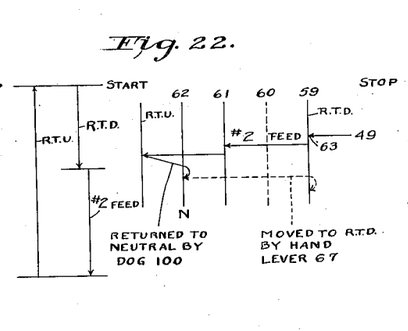

When so desired the plunger 60 may either be eliminated from the assembly or held depressed by any suitable mechanical means so that it will not engage the rack-bar 49. This eliminates No. 1 feed and permits the machine to be operated in the cycle represented by Fig. 22 in which the drill-head is given (1) rapid traverse down, (2) No. 2 feed down (No. 1 feed being ineffective) (3) rapid traverse up, and then brought to rest.

Figure 23:
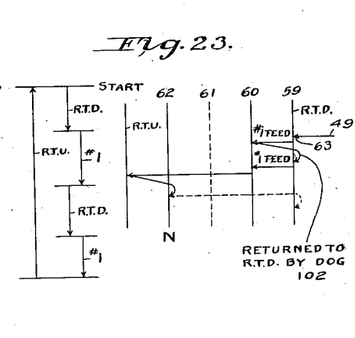

Likewise plunger 61 may be eliminated or rendered ineffective (thereby eliminating feed No. 2) and dog 102 may be utilized to return the rack bar to rapid traverse down after the first slow feed so that the machine will be operated in the cycle represented by Fig. 23 in which case the drill head is given (1) rapid traverse down (2) No. 1 slow feed down (3) rapid traverse down (4) No. 1 slow feed down (5) rapid traverse up, and then brought to rest. This cycle is particularly useful where it is necessary to drill through two spaced sections or bosses with a considerable gap between, through which it is desirable to pass rapidly after the first drilling operation. This cycle may be used instead of that represented by Fig. 20.

It has been shown and described that plungers 61 and 62 may be connected together by a cross pin 97 so that the two plungers will be depressed by a single dog. In a like manner various other pairs of plungers may be connected together so that they will be depressed simultaneously, thereby permitting the rack-bar to jump two spaces instead of one. Another way of accomplishing this result is by the use of separate dogs for each plunger and by so setting the dogs that two adjacent plungers will be depressed simultaneously.

Figures 3, 4, 26:
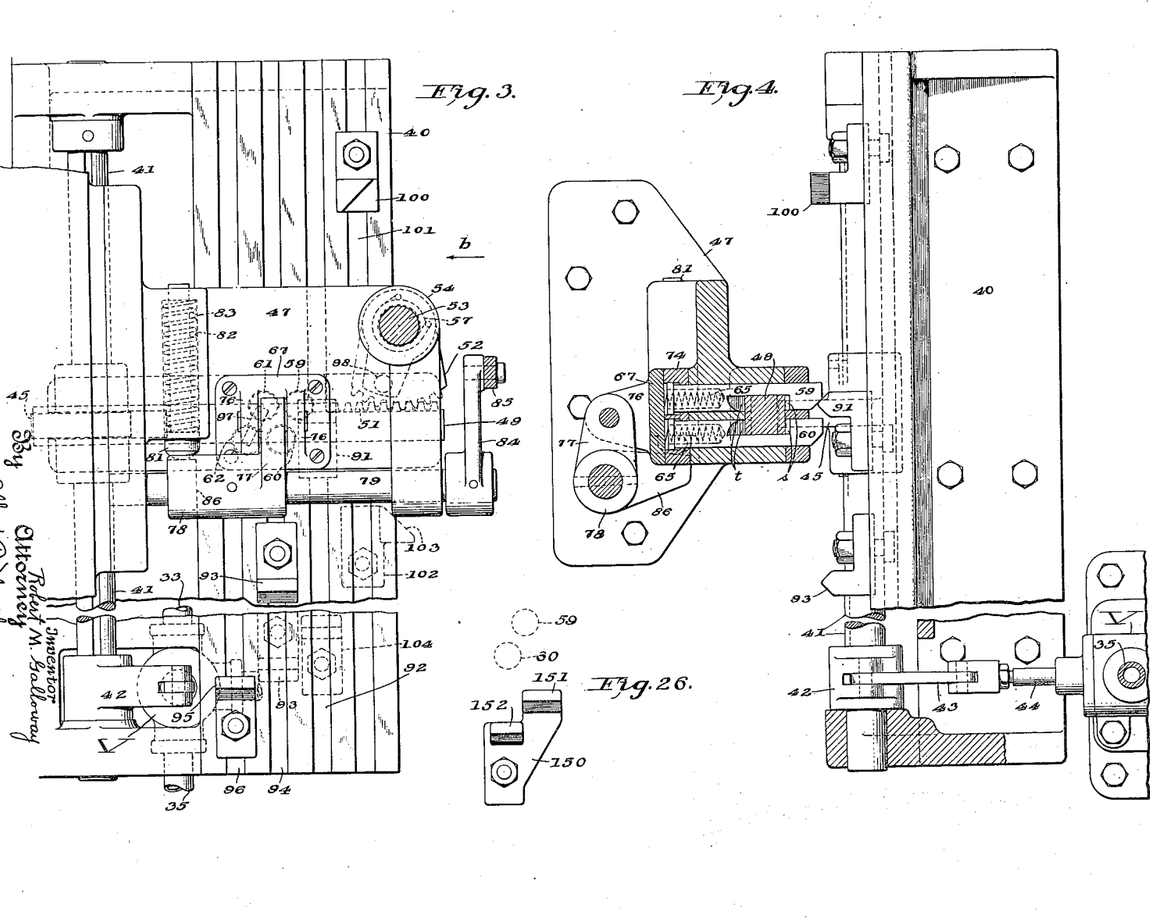
Figure 7:
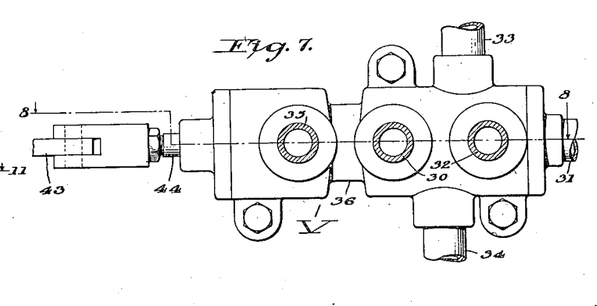
Figs. 7, 8 and 9 are side, sectional and end views, respectively, of the pump controlling valve.
Figure 8:
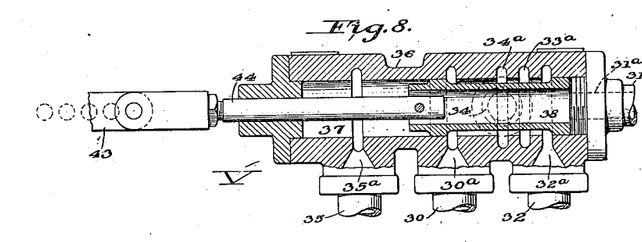
Figure 9:
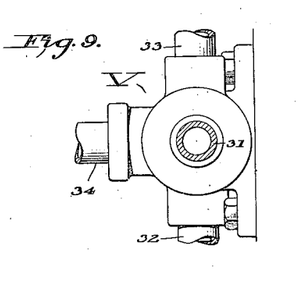
Figure 24:
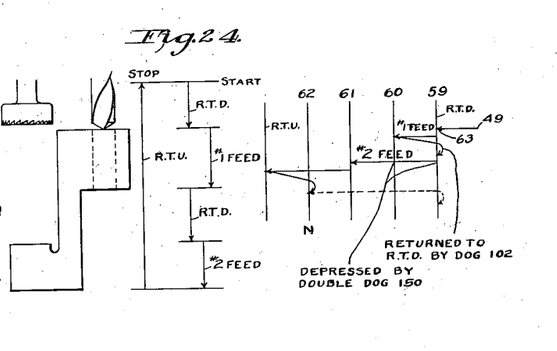

Still another way is to provide a double dog 150, as shown in Fig. 26, having portions 151 and 152 adapted to act simultaneously on two of the plungers. By securing the double dog 150 to the bracket 40, beneath the dogs 91 and 102 in place of the dog 93, and by having the plungers 61 and 62 depressed simultaneously either by pin 97 or individual dogs the machine may be operated in the cycle illustrated by Fig. 24. This cycle is particularly useful where drilling and facing are to be performed in a single operation. In the combined drilling and facing a cycle illustrated in Fig. 24, the drill-head is given (1) a rapid traverse down to bring the drills into contact with the work (2) a No. 1 down feed to force the drill into the work, (3) dog 102 then returns rack-bar and again effects rapid traverse down to bring facing tool into contact with work, the drills running idly in their drilled holes, (4) double dog 150 then depresses plungers 59 and 60 and permits the rack-bar to move against plunger 61 thereby effecting a No. 2 down feed to perform the facing operation (5) rapid traverse up and stop.

Figure 25:
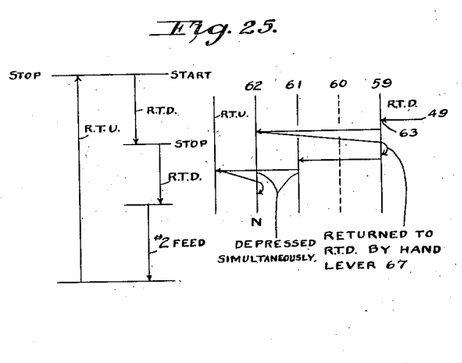

For certain drilling operations a bushing plate is clamped to the top of the casting to be drilled and the casting and plate are placed on the work-support approximately in drilling position. The head and drills are then brought down rapidly to a position where the points of the drills just clear the top of the bushing plate and stopped. The work and bushing plate are shifted to bring the apertures in the bushing plate exactly in line with the drills. The drill head is then given a second rapid traverse down to cause the points of the drills to pass through the bushing plate into contact with the work. A slow power feed is next rendered effective to feed the drills into the work and when the required depth has been reached the drill head is given a rapid traverse up and brought to rest. This cycle is represented in Fig. 25 and is effected in the following manner; plunger 60 is eliminated or rendered ineffective and a double dog 150 is secured to the bracket 40 instead of the dog 91, simultaneously to depress plungers 59 and 61 to permit the rack to move to neutral position against plunger 62 as the points of the drills near the work. After the work has been re-arranged the operator retracts the rack by actuating the hand-lever 67' and causes the shoulder 63 to engage plunger 59 which again effects a rapid traverse down when the drills have passed through the bushing plate and reached the work, plunger 59 is again depressed by dog 104 thereby permitting the shoulder 63 on the rack to move into contact with plunger 61 and effect a No. 2 down feed. When the drills have entered the work to the desired depth plungers 61 and 62 are depressed simultaneously by any suitable means such as by a double dog or by two single dogs or by a single dog acting upon 62 (61 and 62 being connected by the pin 97) and the rack-bar passes its extreme position wherein it effects a rapid traverse up of the drill-head after which it is brought to rest as hereinbefore described.

From the foregoing it will be perceived that this invention provides a simple and efficient automatic control for a variable-speed reversible hydraulic transmission by means of which the drill head of a drilling machine or any translatable member of any other machine readily may be given translatory movements in opposite directions and by means of which the rate of movement in one direction may be varied as may be required by the nature of the operation being performed.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A drilling machine combining a translatable drill head; a hydraulic transmission to effect translation of said drill head, said transmission comprising a cylinder, a piston movable in the cylinder and operatively connected with said drill head; a variable displacement pump; pipes connecting said pump with said cylinder at opposite sides of said piston; hydraulic means, including a fluid pressure line, exteriorly of said pump, connected to said pump, and a controlling valve independent of and remote from said pump and effective in said pressure line to determine the action of said pump and thereby the rate and path of flow of fluid from said pump into said cylinder, to translate said drill head in either direction and at a plurality of rates in one direction; and mechanical means, automatically controlled in the different positions of said head, to actuate said valve to effect a predetermined cycle of movement of said drill head.

2. A drilling machine combining a translatable drill head; a hydraulic transmission to effect translation of said drill head, said transmission comprising a cylinder, a piston movable in the cylinder and operatively connected with said drill head; a variable displacement pump; pipes connecting said pump with said cylinder at opposite sides of said piston; hydraulic means, including a fluid pressure line, exteriorly of said pump, connected to said pump, and a controlling valve independent of and remote from said pump and effective in said pressure line to determine the action of said pump and thereby the rate and path of flow of fluid from said pump into said cylinder, to translate said drill head in either direction and at a plurality of rates in one direction; and automatic means to actuate said valve a plurality of times during a uni-directional movement of said drill head to vary the output of said pump and thereby the speed of translation of said head during said movement.

3. A drilling machine combining a translatable drill head; a hydraulic transmission to effect translation of said drill head, said transmission comprising a cylinder, a piston movable in the cylinder and operatively connected with said drill head; a variable displacement pump; pipes connecting said pump with said cylinder at opposite sides of said piston; hydraulic means, including a fluid pressure line, exteriorly of said pump, connected to said pump, and a controlling valve independent of said pump and effective in said pressure line to determine the action of said pump and thereby the rate and path of flow of fluid from said pump into said cylinder to translate said drill head in either direction and at a plurality of rates in one direction; and means actuated by said drill head and during a uni-directional movement thereof to shift said valve to a plurality of pump-varying positions thereby to change the speed of translation of said member.

4. A drilling machine combining a translatable drill head; a hydraulic transmission to effect translation of said drill head, said transmission comprising a cylinder, a piston movable in the cylinder and operatively connected with said drill head; a variable displacement pump; pipes connecting said pump with said cylinder at opposite sides of said piston; hydraulic means, including a fluid pressure line, exteriorly of said pump, connected to said pump, and a controlling valve independent of and remote from said pump and effective in said pressure line to determine the action of said pump and thereby the rate and path of flow of fluid from said pump into said cylinder, to translate said drill head in either direction and at a plurality of rates in one direction; and means, actuated by the movement of said drill head, to move said valve to various positions to cause said pump to effect traversing and feeding movements of said drill head at predetermined times.

5. A control for hydraulic transmissions combining a non-translatable member; a member movable on said non-translatable member; a variable displacement pump and suitable connections between said pump and said translatable member to effect traversing and feeding movements of the latter; a pump regulator comprising a fluid pressure line connected to said pump and adapted to regulate the rate and path of flow of fluid from said pump into said cylinder, thereby to translate said member in either direction and at a plurality of rates in one direction; a controlling valve embodied in said fluid pressure line, said valve being secured to said non-translatable member and having a portion movable to various positions each of which effects, thru said pressure line, a different pump action; valve actuating means secured to the translatable member, and trip dogs supported by said non-translatable member, said trip dogs acting during relative movement of said members to actuate said valve actuating means.

6. A machine tool combining a standard; a member translatably mounted on said standard; hydraulic means for effecting feeding and rapid traversing movements of said member on said standard, said means including a cylinder secured to said standard, a piston movable in said cylinder and operatively connected with said member, a variable displacement pump, and a pipe connecting said pump with said cylinder; a pump regulator, adapted to control the rate and direction of flow from said pump, comprising a fluid pressure line connected with said pump and a valve located remote from said pump and embodied in said pressure line and controlling the flow of fluid through said line; mechanical means actuated in timed relation with the movement of said member to actuate said valve to cause said pump to effect feeding and traversing movements of said member in a predetermined sequence; and means automatically rendered effective at a predetermined point in translation of said member to render said pump ineffective, thereby to bring said member to rest.

7. A machine tool combining a standard; a member translatably mounted on said standard; hydraulic means for effecting feeding and rapid traversing movements of said member on said standard, said means including a cylinder secured to said standard, a piston movable in said cylinder and operatively connected with said member, a variable displacement pump, and a pipe connecting said pump with said cylinder; a pump regulator, adapted to control the rate and direction of flow from said pump, comprising a fluid pressure line connected with said pump and a valve located remote from said pump and embodied in said pressure line and controlling the flow of fluid through said line; mechanical means actuated in timed relation with the movement of said member to actuate said valve to cause said pump to effect feeding and traversing movements of said member in a predetermined sequence; and manual means operative during the translation of said member to reverse the direction of movement of said member.

8. A machine tool combining a standard; a member translatably mounted on said standard; hydraulic means for effecting feeding and rapid traversing movements of said member on said standard, said means including a cylinder secured to said standard, a piston movable in said cylinder and operatively connected with said member, a variable displacement pump, and a pipe connecting said pump with said cylinder; a pump regulator, adapted to control the rate and direction of flow from said pump, comprising a fluid pressure line connected with said pump and a valve located remote from said pump and embodied in said pressure line and controlling the flow of fluid through said line; means actuated in timed relation with the movement of said member to actuate said valve to cause said pump to effect feeding and traversing movements of said member in a predetermined sequence; manual means operative during the translation of said member to reverse the direction of movement thereof; and means rendered effective by said reverse movement to arrest the translation of said member.

9. A machine tool combining a standard; a member translatably mounted on said standard; hydraulic means for effecting feeding and rapid traversing movements of said member on said standard, said means including a cylinder secured to said standard, a piston movable in said cylinder and operatively connected with said member, a variable displacement pump, and a pipe connecting said pump with said cylinder; a pump regulator, adapted to control the rate and direction of flow from said pump, comprising a fluid pressure line connected with said pump and a valve located remote from said pump and embodied in said pressure line and controlling the flow of fluid through said line; mechanical means actuated in timed relation with the movement of said member to actuate said valve to cause said pump to effect feeding and traversing movements of said member in a predetermined sequence; means automatically rendered effective at a predetermined point in translation of said member to render said pump ineffective, thereby to bring said member to rest; and manual means operative at will to discontinue the movement of said member in one direction and to effect movement thereof in a reverse direction at its rapid rate.

10. A machine tool combining a stationary member; a member translatable on said stationary member; hydraulic transmission for moving said translatable member, said hydraulic transmission including a variable displacement pump; a pump regulator, adapted to control the rate and direction of flow from said pump, comprising a fluid pressure line connected with said pump and a valve located remote from said pump and embodied in said pressure line and controlling the flow of fluid through said line to vary the action of said pump; valve actuating means normally tending to move said valve to effect a predetermined condition in said pump; a stop to prevent shifting of said valve under the influence of said actuating means; and automatic means to render said stop ineffective, to permit said valve to move.

11. In a hydraulic transmission including a variable displacement pump, a pump regulator, adapted to control the rate and direction of flow from said pump, comprising a fluid pressure line connected with said pump and a valve located remote from said pump and embodied in said pressure line and controlling the flow of liquid through said line and to said pump; valve actuating means normally tending to move said valve to a predetermined position to effect a predetermined action of said pump; a stop to prevent movement of said valve under the influence of said actuating means; and automatic means to render said stop ineffective, to permit the valve to move to said position.

12. A machine tool combining a stationary member; a member translatable on the stationary member; a hydraulic transmission for moving said translatable member, said transmission including a variable displacement pump; a pump regulator, adapted to control the rate and direction of flow from said pump, comprising a fluid pressure line connected with said pump and a valve located remote from said pump and embodied in said pressure line and controlling the flow of fluid through said line; a valve actuator secured to one of said members; a plurality of dogs secured to the other member and adapted by the relative movement of said members to effect shifting of said valve actuator, and thereby said valve, in a predetermined sequence to vary the action of the pump and the rate of translation of said member.

13. A machine tool combining a non-translatable member; a translatable member movable thereon; hydraulic means for moving said translatable member, said hydraulic means including a variable displacement pump; means to regulate the action of said pump, said means including a fluid pressure line connected to said pump and a controlling valve embodied in said pressure line, said valve comprising a fixed casing having ports connected with said pressure line and a shiftable element in said casing having a port adapted selectively to register with the ports in said casing to determine the flow of fluid through said pressure line to said pump;

valve actuating means normally tending to move said shiftable element to a predetermined position; a plurality of stops to prevent shifting of said valve element under the influence of said actuating means; and automatic means controlled by the movement of said translatable member successively to render said stops ineffective thereby to permit said valve to vary the action of the pump.

14. A machine tool combining a non-translatable member; a translatable member movable thereon; hydraulic means for moving said translatable member, said hydraulic means including a variable displacement pump; means to regulate the action of said pump, said means including a fluid pressure line connected to said pump and to a controlling valve embodied in said pressure line, said valve comprising a fixed casing having ports connected with said pressure line and a shiftable element in said casing having a port adapted selectively to register with ports in said casing to determine the flow of fluid through said pressure line to said pump; a valve actuator; means normally acting upon said actuator tending to shift said actuator and thereby said valve element; a plurality of stops normally obstructing the movement of said actuator; a plurality of dogs carried by one of said members and adapted by the relative movement of said members to shift said stops to an ineffective position in a predetermined sequence.

15. A machine tool combining a non-translatable member; a translatable member movable thereon; hydraulic means for moving said translatable member, said hydraulic means including a variable displacement pump; means to regulate the action of said pump, said means including a fluid pressure line connected to said pump and a controlling valve embodied in said pressure line, said valve comprising a fixed casing having ports connected with said pressure line and a shiftable element in said casing having a port adapted selectively to register with the ports in said casing to determine the flow of fluid through said pressure line to said pump; a valve actuator supported by one of said members; pressure means actuating upon said valve actuator normally to shift said valve element to a predetermined position; a plurality of stops acting upon said actuator to prevent it from moving under said pressure means; a plurality of trip dogs supported by the other of said members and rendered effective by the relative movement between said members to move said stops to ineffective positions to permit said actuator automatically to shift said valve.

16. A machine tool combining a non-translatable member; a translatable member movable thereon; a hydraulic transmission for moving said translatable member in a single direction at a plurality of rates, said transmission including a variable displacement pump; means to regulate the action of said pump, said means including a fluid pressure line connected to said pump and a controlling valve embodied in said pressure line, said valve comprising a fixed casing having ports connected with said pressure line and a shiftable element in said casing having a port adapted selectively to register with the ports in said casing to determine the flow of fluid through said pressure line to said pump; a slide-bar carried by one of said members and operatively connected with said shiftable element; spring means normally tending to shift said slide-bar and said valve element; a plurality of spring pressed plungers normally obstructing the movement of said slide-bar; and a plurality of trip dogs secured to the other of said members and adapted by the relative movement of said members successively to disconnect said plungers from said slide-bar to permit said bar successively to shift said valve element to various pump varying positions.

17. A machine tool as set forth in claim 16 having manual means adapted simultaneously to render all of said plungers ineffective to restrain the movement of said slide-bar thereby to permit said valve to discontinue the movement of said movable member in one direction, to move it in the opposite direction and then bring it to rest.

18. A machine tool combining a movable member; a hydraulic transmission to move said member in a plurality of directions and at a plurality of speeds in one direction, said means including a variable pump; a pump regulator, adapted to control the rate and direction of flow from said pump, comprising a fluid pressure line connected with said pump and a valve located remote from said pump and embodied in said pressure line and controlling the flow of fluid through said line; automatic means successively to move said valve to predetermined positions to effect a predetermined cycle of movement of said member; manual means to render said automatic means inoperative; and manual means to shift said valve to any of its operative positions to effect movement of said member in either of two directions at any available rate.

19. A machine tool combining a translatable member; a hydraulic transmission to translate said member at slow and rapid rates, said transmission including a pump; a valve having a plurality of effective positions and a neutral position and adapted in its various positions to change the effective action of said pump; a valve actuator connected with said valve; means acting upon said actuator and constantly tending to shift said actuator and valve to a predetermined position; a plurality of stop plungers having portions normally obstructing the movement of said actuator; trip dogs adapted in the movement of said member to shift certain ones of said plungers to move said portions to unobstructing positions; and an operative connection between two of said plungers whereby one of said plungers is shifted by the movement of the other.

20. A machine tool combining a non-translatable member; a member translatable thereon; hydraulic means to move said translatable member; a valve having a portion movable to a plurality of positions and in each position effecting a different action of said hydraulic means; a valve actuator supported by one of said members; means acting upon said actuator and tending to shift said valve to a predetermined position; a plurality of stops acting successively upon said actuator to retain it and the valve actuated thereby in different operative positions; trip dogs carried by the other of said members and rendered effective by the relative movement of said members successively to remove said stops to ineffective positions to permit said actuator successively to engage the next stop; and a double dog adapted to act simultaneously to remove two of said stops, to permit said valve actuator to move idly through one of its operative positions.

21. A machine tool combining a non-translatable member; a member translatable thereon; a hydraulic transmission to move said translatable member; a valve having a portion movable to a plurality of positions and in each position producing a different effect in said hydraulic transmission; a valve actuator; means to shift said valve actuator and thereby said valve to a plurality of operative positions and to one neutral position intermediate two of said operative positions; a stop to maintain said actuator and valve in each of said positions; individual means successively to render ineffective certain ones of said stops; means to render ineffective simultaneously the stop controlling one of said operative positions and the neutral stop to permit said actuator and valve to pass idly through their neutral position to an operative position; and means to return said actuator and valve to their neutral positions.

22. A machine tool combining a non-translatable member; a translatable member movable on said non-translatable member; a pump and suitable connections between said pump and said translatable member to effect feeding movements of the latter; a pump regulator comprising a fluid pressure line and a controlling valve embodied in said line, said valve having a portion movable to various positions each of which effects, through said pressure line, a different pump action; valve actuating means including a slide bar carried by said translatable member and operatively connected with the movable portion of said valve; a spring adapted to shift said slide-bar; a detent device to maintain said spring ineffective to shift said slide bar; and a dog supported by said non-translatable member and acting, during relative movement of said members to render said detent means ineffective.

23. A machine tool combining a non-translatable member; a translatable member movable thereon; a pump and suitable connections between said pump and said translatable member to effect feeding movements of the latter; a pump regulator comprising a fluid pressure line and a control valve embodied in said line, said valve having a portion movable to a plurality of positions each of which effects a different pump action; valve actuating means comprising a hand lever carried by said translatable member; a rack and gear connection between said lever and said slide bar; an oscillatory shaft actuated from said slide bar; and an operative connection between said shaft and the movable portion of said valve.

24. A machine tool combining a non-translatable member; a translatable head movable thereon; a hydraulic motor for effecting movement of the head; a pump supplying fluid pressure for actuating said motor; a pump regulator comprising a fluid pressure line and a control valve embodied in said line, said valve having a portion movable to a plurality of positions in each of which it effects different pump action; valve actuating means comprising a hand lever fulcrumed on said head; a bar slidably mounted on said head; a gear segment journaled in said head and meshing with rack teeth on said slide-bar; an operative connection between said hand lever and said segment; an oscillatory shaft operatively connected with the movable portion of said valve; and a rack and gear connection between said slide-bar and said shaft.

25. A machine tool combining a non-translatable member; a head slidably mounted thereon; a hydraulic motor for effecting movement of said head; a pump supplying fluid under pressure for actuating said motor; a pump regulator comprising a fluid pressure line and a control valve embodied in said line said valve having a portion movable to a plurality of positions in each of which it effects different pump action; valve actuating means comprising a slide-bar; means to shift said slide-bar in one direction in opposition to a spring; detent means to prevent said bar from being moved in the opposite direction by the tension of said spring; an operative connection between said bar and the movable portion of said valve, said connection including an oscillatory shaft and a rack and pinion, the latter having a splined connection with said shaft; and a trip dog supported by said non-translatable member and acting upon said detent to render the latter ineffective, thereby to cause said slide bar and valve to be moved under said spring tension.

26. A machine tool combining a non-translatable member; a head slidably mounted thereon; a hydraulic motor for effecting movement of said head; a pump supplying fluid under pressure for actuating said motor; a pump regulator comprising a fluid pressure line and a control valve embodied therein, said valve having a portion movable to a plurality of positions in each of which it effects different pump action; valve actuating means comprising a hand lever carried by said head; a bar slidably mounted on said head; a rack and gear connection between said hand lever and said bar; an operative connection between said bar and the movable portion of said valve; and dogs supported by said non-translatable member and serving during relative movement of said members to effect shifting of said slide bar and thereby shifting of the movable portion of said valve.

27. In a machine tool according to claim 26, manual means to shift said slide bar and valve portion to effect maximum pump output and thereby rapid advance of said head; a first dog carried by said non-translatable member to effect shifting of said valve to reduce the rate of pump delivery thereby to reduce the rate of movement of said head; a second dog to effect shifting of said valve to reverse the action of said pump thereby to reverse said head; and a third dog to shift said valve to a neutral position thereby to reduce pump delivery to zero to bring said head to rest.

28. A drilling machine combining an upright column; a drill head translatably mounted on said column; a hydraulic motor operatively connected with said drill head for effecting reciprocation of the latter; a pump supplying fluid pressure to actuate said motor; a pump regulator comprising a fluid pressure line receiving fluid from said pump, a valve located exteriorly of said pump and connected with said pressure line, and a plurality of conduits extending back to said pump, said valve having a portion movable to various positions each of which effects, through said pressure line and conduits, different pump action; valve actuating means comprising a hand lever carried by said drill head, a side-bar carried by said drill head, a rack and gear connection between said lever and said slide-bar, an oscillatory shaft actuated from said slide-bar; an operative connection between said shaft and the movable portion of said valve; and automatic means to shift said slide-bar.

29. A machine tool combining a stationary member; a member translatable thereon; a hydraulic motor for translating the last named member; a pump providing fluid pressure for actuating said motor; pump regulating means comprising a fluid pressure line and a control valve embodied therein; manual means, including an actuating lever carried by said translatable member, to shift said valve to initiate an operative cycle; automatic means operative thereafter to shift said valve to complete said cycle; and a disconnectible connection between said lever and said valve whereby the lever is not actuated by said automatic means.

In witness whereof, I have hereunto subscribed my name.

ROBERT M. GALLOWAY.

DISCLAIMER 1,685,049.—*Robert M. Galloway*, Richmond, Ind. OIL-GEAR CONTROL FOR MACHINE TOOLS. Patent dated September 18, 1928. Disclaimer filed July 30, 1930, by the assignee, *The National Automatic Tool Co.*, and the patentee.

Hereby disclaim from the scope or meaning of said claims numbered 6, 7, 8, 9, 10, and 18 of said Letters Patent No. 1,685,049 any and all machine tools other than machine tools of the multiple-spindle drilling-machine type; and accordingly, particularly disclaim from the meaning of the term "machine tool" appearing in line 1 of each of said claims numbered 6, 7, 8, 9, 10, and 18 any and all machine tools other than machine tools of the multiple-spindle drilling-machine type; and further disclaim from the meaning of the translatable "member" of said claims numbered 6, 7, 8, 9, 10, and 18 particularly referred to in line 2 of claims 6, 7, 8, and 9 as a "member translatably mounted," in line 2 of claim 10 as a "member translatable" and in lines 1 and 2 of claim 18 as a "movable member," any and all members or devices other than a multiple-spindle drill head.

Your petitioners further disclaim claim 11 of said Letters Patent No. 1,685,049, said claim being in the following words:

"11. In a hydraulic transmission including a variable displacement pump, a pump regulator, adapted to control the rate and direction of flow from said pump, comprising a fluid pressure line connected with said pump and a valve located remote from said pump and embodied in said pressure line and controlling the flow of liquid through said line and to said pump; valve actuating means normally tending to move said valve to a predetermined position to effect a predetermined action of said pump; a stop to prevent movement of said valve under the influence of said actuating means; and automatic means to render said stop ineffective, to permit the valve to move to said position."

[*Official Gazette August 19, 1930.*]